United States Patent [19]

Sato et al.

[11] 4,006,720
[45] Feb. 8, 1977

[54] DIVIDED CHAMBER TYPE DIESEL ENGINE

[75] Inventors: Takasi Sato; Hirosi Yosizaki, both of Toyota, Japan

[73] Assignee: Toyota Jidosha Kogyo Kabushiki Kaisha, Japan

[22] Filed: Apr. 21, 1975

[21] Appl. No.: 570,093

[30] Foreign Application Priority Data

Aug. 27, 1974 Japan .................. 49-102652[U]

[52] U.S. Cl. ...................... 123/32 C; 123/30 D; 123/32 ST; 123/191 SP

[51] Int. Cl.² ........................................ F02B 19/00

[58] Field of Search ............ 123/32 K, 32 C, 191 S, 123/191 SP, 30 D, 32 ST

[56] References Cited

UNITED STATES PATENTS

| | | | |
|---|---|---|---|
| 2,799,256 | 7/1957 | Stump | 123/32 C |
| 2,821,177 | 1/1958 | Holt | 123/32 C |
| 3,044,454 | 7/1962 | Sulton | 123/32 C |
| 3,890,940 | 6/1975 | List | 123/32 C |
| 3,895,613 | 7/1975 | Joshi | 123/32 C |

Primary Examiner—Wendell E. Burns
Assistant Examiner—David D. Reynolds
Attorney, Agent, or Firm—Kenyon & Kenyon

[57] ABSTRACT

A divided chamber type diesel engine consisting of a main combustion chamber and a pre-combustion chamber connected to said main combustion chamber through a connecting port, said pre-combustion chamber being provided with a step member on its inner wall for controlling the swirl generated in said pre-combustion chamber during the compression stroke of the engine in order to reduce the $NO_x$ emissions in the exhaust gases.

3 Claims, 2 Drawing Figures

DIVIDED CHAMBER TYPE DIESEL ENGINE

BACKGROUND OF THE INVENTION

This invention relates to a divided chamber type diesel engine used as a prime mover of vehicles, and more particularly relates to a divided chamber type diesel engine having an improved pre-combustion chamber with a step member for controlling the swirl.

As is well known, a divided chamber type diesel engine has a main combustion chamber and a pre-combustion chamber connected to said main combustion chamber through a connecting port. An intense swirl is generated in said pre-combustion chamber during the compression stroke of the engine.

Atmospheric pollution by exhaust gases from vehicles has become an increasingly important problem in recent years, and especially critical parts of this problem are the black smoke, nitrogen oxide $NO_x$ and offensive smells in the exhaust gases of diesel engines which are widely used in large-sized vehicles such as buses and trucks. Generally speaking, the nitrogen oxide $NO_x$ in atmosphere atomophere is harmful to the human body, i.e., for example, it stimulates the cornea of eyes and causes inflammation of the respiratory organs. Even more important in atmospheric pollution is the fact that the aforementioned nitrogen oxide $NO_x$ as well as carbonic hydrogen (hydrocarbon) gives rise to photochemical reactions which cause generation of oxidizing substances such as ozone ($O_3$), aldehyde or PAN (Pyridylazo Naphthol).

A principal object of this invention is to provide a divided chamber type diesel engine which generates less nitrogen oxide $NO_x$ in its exhaust gas than the conventional engine of the same type.

Another object of this invention is to provide a divided chamber type diesel engine having a simply constructed pre-combustion chamber, which chamber is able to control the swirl generated within itself in such a manner that, compared to conventional engines of the same type, there is less nitrogen oxide $NO_x$ generated although there are little deteriorations in the engine performances.

DESCRIPTION OF THE PREFERRED EMBODIMENT

Figure 1:
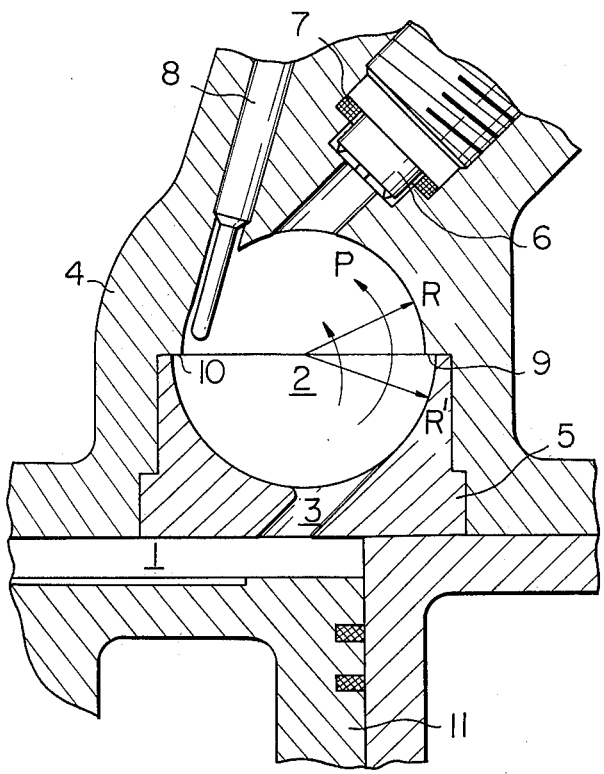
FIG. 1 is a partial cross-sectional view of an embodiment of a divided chamber type diesel engine according to this invention.

In FIG. 1 an embodiment of a divided chamber type diesel engine according to this invention is disclosed, with only a section of the pre-combustion chamber thereof being shown in the drawing. In this embodiment a pre-combustion chamber (swirl chamber) 2 is connected to a main combustion chamber 1 through a connecting port 3. The pre-combustion chamber 2 is defined between a cylinder head 4 of this diesel engine and a metal inserting member 5 rigidly inserted into a cavity provided in the cylinder head 4. A fuel injection nozzle 6 is threaded into the cylinder head 4 and serves for the injection of fuel from its head portion into the pre-combustion chamber 2. An annular nozzle seat 7 for sealing between the cylinder head 4 and the fuel injection nozzle 6 is disposed therebetween. A glow plug 8 is also threaded into the cylinder head 4, the head portion of plug 8 being projected into the pre-combustion chamber 2. The head portion of the glow plug 8 warms the main and pre-combustion chamber 1 and 2, so that when for example this diesel engine is to be started, the fuel injected from the injection nozzle 6 can be easily ignited.

In the embodiment shown in FIG. 1, the cross-sectional configuration of the pre-combustion chamber 2 is substantially circular. However, the radius (R) of the cross-sectional portion of the pre-combustion chamber 2 defined in the cylinder head 4 is slightly smaller than the radius (R') of the cross-sectional portion defined in the inserting member 5 (R<R'), so that step portions 9 and 10 (R'−R) are formed on the circumferential wall of the precombustion chamber 2. The step portion 9 is more important than the step portion 10 because the turbulence stream flowing in the precombustion chamber 2 directly impinges on the step portion 9.

The functioning and effect of this divided chamber type diesel engine will be now described on the basis of the above-embodiment shown in FIG. 1. When a piston 11 slidingly and sealingly engaging the wall of the main combustion chamber 1, moves upward during the compression stroke of this engine, the air contained in the main combustion chamber 1 is compressed and violently flows into the pre-combustion chamber 2 through the connecting port 3. This compressed air generates an intense swirl in the pre-combustion chamber 2 in the direction indicated by arrows P. A part of the turbulence flow comes into collision with the step portion 9 and is interrupted so that the intensity of the swirl generated in the pre-combustion chamber 2 is restricted. The fuel injected from the fuel injection nozzle 6 burns in the pre-combustion chamber 2 and, then, the burned gas and the unburnt fuel violently flow from the pre-combustion chamber 2 through the connecting port 3 into the main combustion chamber 1, in which the unburnt fuel burns, and the piston 11 is pushed downwardly.

Figure 2:
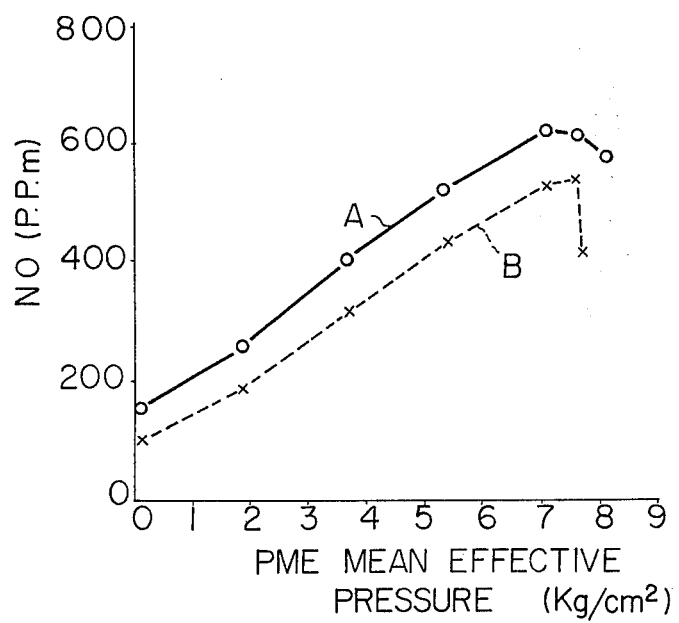
FIG. 2 is a concentration-pressure graph showing amounts of nitrogen oxide $NO_x$ contained in the exhaust gases of the divided chamber type diesel engine of this invention and a conventional engine of the same type at the different effective mean pressures.

FIG. 2 is a concentration-pressure graph of the amounts of nitrogen oxide $NO_x$ contained in the exhaust gases of the divided chamber type diesel engine of this invention and a conventional turbulence type diesel engine (a diesel engine having a pre-combustion chamber in which a step portion as aforementioned is not provided). In this graph, the axis of abscissa shows the mean effective pressure (kg/cm²) of engine output shaft, the axis of the ordinate shows the concentration (PPM) of the nitrogen oxide $NO_x$ contained in the exhaust gases, the line A indicates a conventional turbulence type diesel engine and the broken line B indicates the divided type diesel engine of this invention. In this case, the step portion 9 (FIG. 1) provided on the inner wall of the pre-combustion chamber 2 constituted 6.5 percent of the radius R of the cross-sectional portion of the pre-combustion chamber $$\left(\frac{R'-R}{R} = 0.065\right).$$

As is clearly shown in FIG. 2, the concentration of the nitrogen oxide $NO_x$ contained in the exhaust gases of the divided type diesel engine of this invention is definitely less than that of a conventional diesel engine of the same type. The reason for this phenomenon is presumed to be that the swirl in the pre-combustion chamber 2 generated by the violent air flow through the connecting port 3 is enfeebled by the intervention of the step portion 9, formed on the inner wall of the pre-combustion chamber 2, and the combustion in both the main and pre-combustion chambers 1 and 2 becomes more gentle, which results in the creation of nitrogen oxide $NO_x$ being restrained. The exact reasons, however, are not clear at present.

In the divided chamber type diesel engine of this invention, as above described on the basis of an embodiment and a graph, step portion 9 formed on the inner wall of the pre-combustion chamber 2 can be advantageously constituted within the range of from 3 to 10 percent of the radius R of the cross-sectional portion of the pre-combustion chamber. Particularly, it has been experimentally confirmed that when the step portion 9 is constructed of about 6 percent of the radius R, the most favorable result is obtained. It has been also experimentally confirmed that the divided chamber type diesel engine of this invention does not sacrifice any of its essential engine performance since the step portion 9 is set up within the aforementioned range. This invention does, however, provide a superior effect in that the amount of nitrogen oxide $NO_x$ contained in the exhaust gases therefrom is definitely reduced by the simple construction of forming a step portion on the inner wall of a pre-combustion chamber.

As many apparently widely different embodiments of this invention may be made without departing from the spirit and scope thereof, it is to be understood that the invention is not limited to the specific embodiment hereinbefore described but, rather, is limited only as defined in the appended claims.

What is claimed is:

1. A divided chamber type of diesel engine including a block containing a cylinder; a cylinder head mounted on the block; a piston in the cylinder; a main combustion chamber defined between the piston and the cylinder head; a cavity formed in the cylinder head and opening into the main combustion chamber; and an insert member rigidly fitted into the opening of the cavity provided in said cylinder head, the insert member having a cavity facing the cavity in the cylinder head to define a pre-combustion chamber and a port connecting the pre-combustion chamber to the main combustion chamber, wherein the improvement comprises:

the cross-sectional configuration of said pre-combustion chamber is substantially circular, and the radius R of the cross-sectional portion of said pre-combustion chamber formed by the cavity in said cylinder head is slightly smaller than the radius R' of the cross-sectional portion formed by the cavity in said insert member (R < R'), whereby a step portion is formed on the inner circumferential wall of said pre-combustion chamber for controlling the swirl generated in said pre-combustion chamber during the compression stroke of the diesel engine in order to reduce the $NO_x$ emissions in the exhaust gases.

2. A divided chamber type of diesel engine as claimed in claim 1, wherein the width of said step portion formed on the inner wall of said pre-combustion chamber is in the range of from 3 to 10 percent of the radius R of the cross-sectional portion of said pre-combustion chamber formed by the cavity in the cylinder head $$\left( 0.03 < \frac{R' - R}{R} < 0.1 \right).$$

3. A divided chamber type of diesel engine according to claim 1. wherein said connecting port opens into the pre-combustion chamber in a direction substantially tangent to the inner surface of the cavity in the insert member.

* * * * *